March 7, 1944.   J. H. CHURCH   2,343,279
RANGE FINDER
Filed Feb. 28, 1941
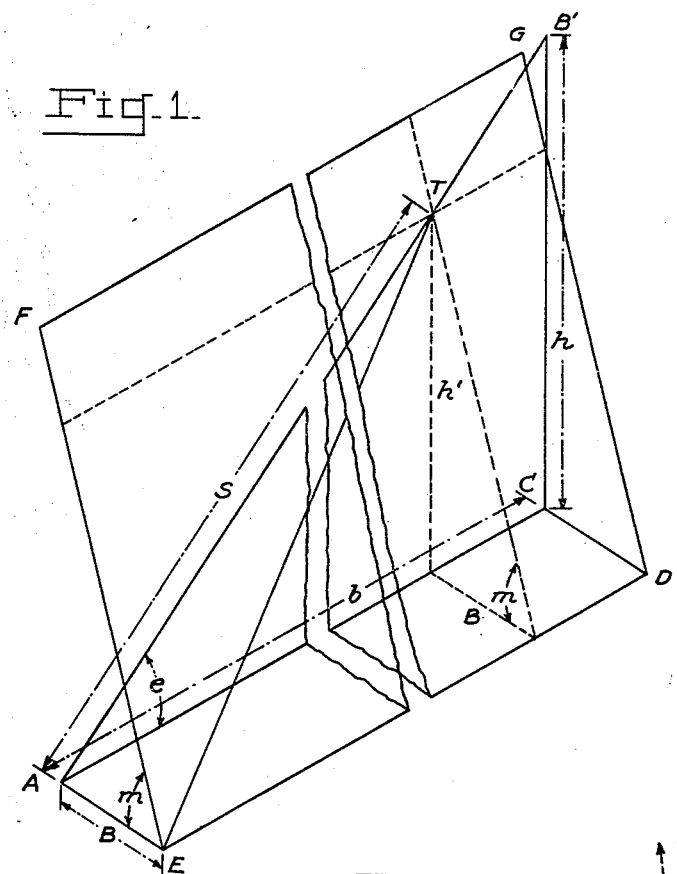
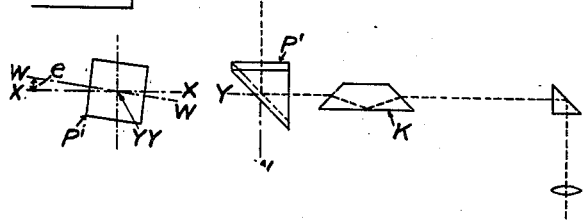
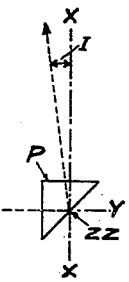
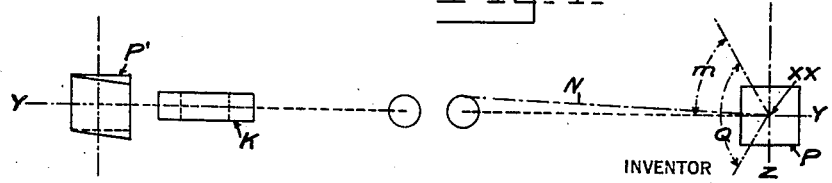
INVENTOR
Joseph H. Church
BY
ATTORNEY Patented Mar. 7, 1944

2,343,279

UNITED STATES PATENT OFFICE 2,343,279

RANGE FINDER

Joseph H. Church, Austin, Minn.

Application February 28, 1941, Serial No. 381,055

13 Claims. (Cl. 88—2.7)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a rangefinder.

It is an object of the invention to provide a self-contained rangefinder comprised of two telescopic systems separated a known short distance or base that is adapted for use by a single inexperienced observer in rapidly measuring the parallactic angle that the object to which range is being determined subtends at said base.

It is another and particular object of the invention to provide an entirely new arrangement of the telescopic systems which permits greater accuracy in determining the necessary angles, and thereby, greater accuracy in the determination of the range. Generally speaking, this object is accomplished by projecting the angle between the base and the line of sight of at least one of the telescopic systems into another plane, thereby so reducing it that it lies within a range of angles where the tangent and secant functions are more accurately determinable.

A further object of the invention is to provide a rangefinder system that may be embodied in binocular telescopic form and which utilizes fusion of the object images formed by the two telescopic systems to indicate the parallactic angle.

The specific nature of the invention as well as other objects and advantages thereof will clearly appear from a description of a preferred embodiment as shown in the accompanying drawing in which:

Fig. 1 is a perspective view showing the geometric principles upon which the instant rangefinder is based;

Fig. 2 is a diagrammatic plan view of the proposed rangefinder;

Fig. 3 is a diagrammatic elevational view as seen from the left end of Fig. 2; and Fig. 4 is a diagrammatic elevational view as seen from the rear of the view shown by Fig. 2.

Referring first to Fig. 1, the following may be observed:

AB'C is a right triangle disposed in the vertical plane.

Right triangle AB'C has an altitude $h$, base $b$ and angle $e$ fixed as shown hereinafter. The triangle is rotatable in the vertical plane about its apex A.

ACDE is a rectangle having the side AC common with the base $b$ of the triangle AB'C and is disposed in a plane normal to the plane of the triangle.

The line of sight from A to a target T will always fall upon the hypotenuse AB' of triangle AB'C.

EFGD is an inclined rectangle having its side ED coinciding with the corresponding side of rectangle ACDE and is rotatable through angle $m$ about its side ED in intersecting relation to the hypotenuse AB' of triangle AB'C.

The side AE of rectangle ACDE coincides with the base B of a self-contained base range finding instrumentality.

S is the range AT of a target T.

In the triangular figure AB'C the range S of target T from point A is:

(1) $$S = \frac{h'}{\sin(e)}$$

or, (2) $$h' = S \cdot \sin(e)$$

also;

(3) $$h' = B \cdot \tan(m)$$

therefore, by equating (2) and (3);

(4) $$S \cdot \sin(e) = B \cdot \tan(m)$$

and transposing;

(5) $$S = \frac{B \cdot \tan(m)}{\sin(e)}$$

but, $$\frac{b}{\sin(e)} = \text{a constant } k$$

by construction of the rangefinder so;

(6) $$S = k \cdot \tan(m)$$

Equation 6 is general; however, it is desired to place a maximum limit of 83° on angle ($m$) in order to avoid the asymptotic portion of the tangent curve; therefore, this limit of 83° taken in conjunction with the length of base B of the rangefinder may be used to determine the minimum angle ($e$) and hence the maximum range the rangefinder can effectively determine where angle ($m$) is not to exceed 83°.

Suppose the situation where angle ($m$) = 83° and base B is one (1) meter then, $$\frac{h}{B} = \tan 83° \text{ or, } h = B \cdot \tan 83°$$

$$\tan 83° = 8.1443 \text{ and since } B=1,$$
$$h = 8.1443 \text{ meters}$$

which is the maximum permissible altitude of triangle AB'C, where angle ($m$) is not to exceed 83° and base B is equal to one (1) meter.

Angle ($e$) is arbitrarily selected, consequently the determination of $h$ and selection of angle ($e$) fixes the maximum range determining limit of the instrument where angle ($m$) is not to exceed 83°.

As will be seen from Fig. 1, S will be maximum when it coincides with the hypotenuse $AB'$; therefore, $$S \text{ (maximum)} = AB' = \frac{h}{\sin (e)}$$

If angle ($e$) be taken as 10′ then $$S \text{ (maximum)} = \frac{8.1443}{\sin 10'} = \frac{8.1443}{.0029} = 2,808 \text{ meters}$$

The illustration given is simply by way of example and not limitation since the constant $k$ may be varied to suit the purposes at hand by varying either factor $e$ or B or both.

That the described method permits greater accuracy in determining the range of a given point than do the methods hitherto used in the art of rangefinding is more apparent from the following considerations. Hitherto the determination of the range S has been accomplished by direct measurement of the angle between one of the lines of sight and the base line B; i. e., either one of the angles AET and EAT. For the purpose of this discussion, I call these the parallactic angles. Generally, such measurement is accomplished by mounting the optical receiver at the end of the base line B for rotation in the plane of—and solely in the plane of—the lines of sight AT and ET, and measuring the desired parallactic angle by the amount of that rotation necessary to properly sight the receiver on the target T. Since, however, these parallactic angles AET and EAT are almost always very close to 90°, small errors in measuring them produce large errors in the determination of the range. This results from the fact that the range is calculated as a function of the base and either the tangent or secant of one of the parallactic angles (parallactic angle AET, for example), and that within the range of angles above about 83°, both of these trigonometric functions are asymptotic in form for which reason they vary greatly with respect to small variations of the angle itself.

By my improved method, I have in effect projected the parallactic angle AET into a plane (plane AEF) offset from the plane of the lines of sight ET and AT by a fixed angle (90°—$e$) and thereby provided an auxiliary angle (angle $m$) of smaller magnitude than the parallactic angle, which new angle may be used as a measure of range S in the same manner in which the parallactic angle itself was used in the systems hitherto known. It has the added advantage, however, that it can be made to lie within a range (below 83°) wherein small variations in the angle produce only small variations in the trigonometric function desired—and, consequently, only small errors in the calculation of the range S. Thus, the small, but unavoidable errors in the setting of the receivers in proper sighting relationship on the target T, will have less effect on the accuracy of the instrument when my system is employed. To state the operation of the system, in other words, I might say that in effect I have multiplied the parallactic angle AET by a reducing factor which is a constant of the system, and thereby brought it within a range wherein it may be determined with greater precision. It may be pointed out that a characteristic difference between my system and those used in the prior art is that the rotation of the optical receiver in my system is not confined to a single plane since it must be free to rotate both in the horizontal and vertical direction during the sighting operation. As already pointed out, in those hitherto known, the rotation of the receiver is confined to a single plane, usually the plane of the lines of sight AT and ET or one parallel to it.

A still further advantage of my improved system of range finding will be apparent from a consideration of the calculations immediately following. From these it will be noted that when the angle AET is large, as is always the case, the angle $m$ varies with respect to the range S at a much greater rate than does the parallactic angle AET itself. The scale from which the necessary measurements must be read is, therefore, spread out and the accuracy and ease of reading thereby increased.

Thus, returning to (3) above, we have:

$$h' = B \tan m$$

but $$h' = S \sin e$$

hence (7) $$S = \frac{B \tan m}{\sin e}$$

further (8) $$S = B \tan AET$$

combining (7) and (8)

(9) $$\tan m = \sin e \tan AET$$

differentiating for $$\frac{dm}{d(AET)}$$

$$\sec^2 m \, dm = \sin e \sec^2 AET \, d(AET)$$

or $$\frac{dm}{d(AET)} = \sin e \frac{\sec^2 AET}{\sec^2 m} = \sin e \frac{ET^2}{h'^2 + B^2}$$

since $$\sqrt{h'^2 + B^2} = \frac{h'}{\sin m}$$

then $$\frac{dm}{d(AET)} = \sin e \frac{ET^2 \sin^2 m}{h'^2}$$

further, since $$ET = \sqrt{S^2 + B^2}$$

$$\frac{dm}{d(AET)} = \frac{\sin e \sin^2 m}{\frac{h'^2}{S^2 + B^2}}$$

and when S is large with respect to B, which is the usual case, $$\frac{dm}{d(AET)} = \frac{\sin^2 m}{\sin e}$$

It will be observed from the last equation that so long as the angle $e$ is of such magnitude that its sine is less than the square of the sine of the angle $m$, the rate of change of $m$ as the range S varies will be greater than the corresponding rate of change of the angle AET. In effect, the scale upon which measurements are actually made is spread out to a greater extent than would be the case if parallactic angle AET were measured directly.

Figs. 2, 3 and 4 show a present preferred embodiment of the rangefinder. For convenience of description the receiving reflectors P—P′ of the two telescopic systems as shown in Fig. 2 may be initially regarded as being disposed so as to have their axes W—W and X—X, respectively, parallel with each other and lying in the plane containing axis Y—Y. Receiving reflector P' of one of the telescopic systems is then rotated about axis Y—Y (corresponding to base line B of Fig. 1) through angle $e$ in which position it is fixed in any suitable manner relative to receiving reflector P as shown in Fig. 3. To obviate the leaning effect of the image formed by reflector P' an erecting prism K is disposed in the light path emerging therefrom coaxially of axis Y—Y and rotated one-half angle $e$ from its initial erecting position relative to reflector P'.

The receiving reflector P is suitably mounted for rotation about axis Z—Z to compensate for the horizontal component of the parallactic angle and thereby assure that the observer may obtain the object image in the eyepieces of each of the telescopes, but this movement of prism P in the present embodiment of the invention is not to be construed as being for the purpose of measuring horizontal component I of parallactic angle AET. Receiving reflector P is also movable about axis X—X (corresponding to line ED in Fig. 1) to measure angle $m$. The angle $m$ will be determined when the emergent rays from the reflectors P—P' lie on the axis Y—Y, in which condition of the instrument the images of the object formed in the eyepieces will fuse to form a single stereoscopic view of the object. If the emergent ray from reflector P is angularly disposed with respect to the ray from reflector P' as indicated at N, fusion of the two images will not be achieved and the observer will know that angle $m$ has not been determined.

It should be emphasized that in preference to the well known coincidence type of image matching which does not employ the stereoscopic faculties of the human eyes, I have employed a binocular stereoscopic method of matching the images. In the latter method, each telescope delivers an image to only one eye, the matching of the images perceived by both eyes being accomplished by the physiological processes of depth perception. Binocular stereoscopic methods are, of course, old in the art of rangefinding but it should be noted that the procedure of my system requires movement of the observed images in both the horizontal and vertical directions before fusion in a single stereoscopic image is obtained. Accurate matching is necessary in only the vertical direction since as already pointed out the horizontal parallactic angle does not affect the determination of the range. But it has already been shown by Volkmann and confirmed by Helmholtz that in stereoscopic matching the human ocular system is much more sensitive to the vertical than to the horizontal displacements. The use of this superior sensitivity in the vertical direction is another advantage of my improved system, and to my knowledge use of it has never before been made in the art of rangefinding.

Movement of prism P may be caused to move a pointer over a range scale in proportion to the relation $S = k \cdot \tan m$ as is well understood in the art. Rotating discs having relatively staggered light apertures may be inserted in the light path of each telescope to assist in preventing fusion except when the images are horizontally aligned and to assure that an object image is formed in each of the telescopes. Moreover reticules having stereo marks adapted to fuse on a horizontal line or other desired prearranged design may be employed, whereby extreme difficulty would be experienced in fusing the object images when in any relative positions except horizontal alignment.

While the above described form of instrument is at present preferred, it will be obvious to those skilled in the art that the same result may be achieved by modifications thereof, for example, angle $m$ may be fixed and angle $e$ measured by obvious rearrangement of the manner of functioning of the reflectors P and P', also if for any reason it were so desired, the instrument could be arranged to function on the coincident principle by using a vertically divided field and ocular although this would sacrifice the advantages of stereoscopic matching as mentioned above.

Having now described my invention, I claim:

1. In a rangefinder, a base of known length, an optical receiver at each end of said base, means for sighting each of said receivers on a point of finite range and for determining said finite range as a function of said base and the projection of the angle between the line of sight of at least one of said receivers and said base in a plane through said base and offset from the plane of the lines of sight by an angle, said means comprising means for rotating said one of said receivers about a pair of axes normal to said base and to each other whereby it may be brought into sighting relationship to said point and means for determining the component of such rotation about an axis normal to said offset plane whereby the said projection is determined.

2. In a rangefinder, a base of known length, a fixed optical receiver at one end of said base and adapted to be sighted on a point of finite range, a movable optical receiver at the opposite end of said base adapted to be sighted on said point by rotation about either of two axes normal to each other and to said base but offset from the plane including both said base, and the line of sight of said fixed receiver by a fixed angle, means for sighting each of said receivers on said point of finite range and for determining the projection of the angle between the line of sight of said movable receiver and said base in the plane defined by said base and one of said axes, said last mentioned means comprising means for measuring the component of rotation of said movable receiver about its axis normal to said last mentioned plane whereby the said projection of said angle is determinable, and means for determining said finite range in terms of said base, said projection of said angle and said fixed angle.

3. In a range finder, a base line, means fixed with respect to the base line for deflecting a ray of light from a target along said base line from one end, and means for deflecting a second ray of light from the target along said base line from the other end thereof, said second deflecting means being adjustable to enable selection, for deflection along the said base line of rays which lie, respectively, in planes containing a line perpendicular to the base line at the second mentioned point of deflection, the plane defined by the said perpendicular line and the base line forming a dihedral angle with the plane defined by the base line and the line between the first mentioned deflecting means and the target.

4. In combination with a rangefinder, as in claim 3, binocular stereoscopic image matching means for matching the images observed through each of the optical receivers.

5. A range finder as in claim 3 in which the first mentioned ray is perpendicular to the base line.

6. A range finder as in claim 3 wherein the dihedral angle is an acute angle.

7. A range finder as in claim 3 in which the dihedral angle is not greater than 10 minutes of arc.

8. A range finder as in claim 3 wherein the second mentioned deflecting means comprises a member with only two degrees of rotational freedom about axes perpendicular to each other and to the base line.

9. In a range finder, a base line, means to deflect rays from a target along the base line from the extremities thereof, said means constructed and arranged to establish a plane containing the said rays from the target and the base line as in the conventional method of parallactic angle range finding and to establish a reference plane containing the base line and offset at an acute angle from the first mentioned plane whereby a series of planes through a line, in said reference plane, perpendicular to the base line at one extremity thereof and through the corresponding ray serves to fix and afford a measure of a projection of the parallactic angle formed by the rays at the base line in a plane, the height of the parallactic triangle being less in the projected form and at least one of the base angles thereof being therefore less, thus affording, by measure of the angle of any one of the series of planes with the base line, a greater degree of precision of the true parallactic angle itself.

10. In combination with a rangefinder, as in claim 9, binocular stereoscopic image matching means for matching the images observed through each of the optical receivers.

11. In combination with a range finder, as in claim 2, binocular stereoscopic image matching means for matching the images observed through each of the optical receivers.

12. Means for determining the range of an object which comprises means for sighting on said object from each of two separated points on a straight line for establishing in space a triangle whose base is the said straight line and whose two other sides are the two lines of sight meeting at said object; and means for measuring the angle between said straight line and the projection of at least one of said two sides of said triangle on a plane containing said straight line, and which plane forms such an angle with the plane of said triangle that the angle between the projection of said side and said straight line is materially different from the angle between the said straight line and the said side of the triangle.

13. Means for determining the range of an object which comprises means for sighting on said object from each of two stations on a straight line, the line of sight of one of said stations being substantially perpendicular to said straight line, thereby establishing in space a right triangle whose legs are respectively said straight line and said line of sight perpendicular to said straight line, and whose hypotenuse is the line of sight to said object from the other station on said straight line; and means for measuring the angle between said straight line and the projection of said hypotenuse on a plane containing said straight line and which plane is inclined to the plane of said triangle, said last mentioned plane being at such an angle to the plane of said triangle that the angle between the said projection of said hypotenuse and said straight line is materially different from the angle between said hypotenuse and said line.

JOSEPH H. CHURCH.